Jan. 25, 1938.   M. A. BUCCI   2,106,562

MILKING COW TOY

Filed Jan. 27, 1937

INVENTOR
MARK ANTHONY BUCCI
BY
ATTORNEY

Patented Jan. 25, 1938

2,106,562

UNITED STATES PATENT OFFICE 2,106,562

MILKING COW TOY

Mark Anthony Bucci, Hoboken, N. J.

Application January 27, 1937, Serial No. 122,523

2 Claims. (Cl. 46—115)

This invention relates to new and useful improvements in a milking cow toy.

The invention has for an object the construction of a toy as mentioned which is characterized by material formed to simulate a cow and having perforated teats, and an arrangement by which a liquid may be discharged from said teats to simulate that the cow is giving milk.

More specifically, the invention contemplates providing a hollow cylindrical casing within the cow figure extending from the teats portion to the hind portion in which a valve is slidably arranged and operable by moving the tail of the cow figure, to cause the discharge of the liquid.

Still further the invention proposes the provision of a liquid bottle arranged within the cow figure and having an outlet pipe connecting with the lower portion of said cylindrical casing, which outlet pipe is controlled by said valve.

Still further the invention proposes an arrangement by which the tail may be turned to different positions and when moved upwards and downwards cause a different discharge of the liquid.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 1:
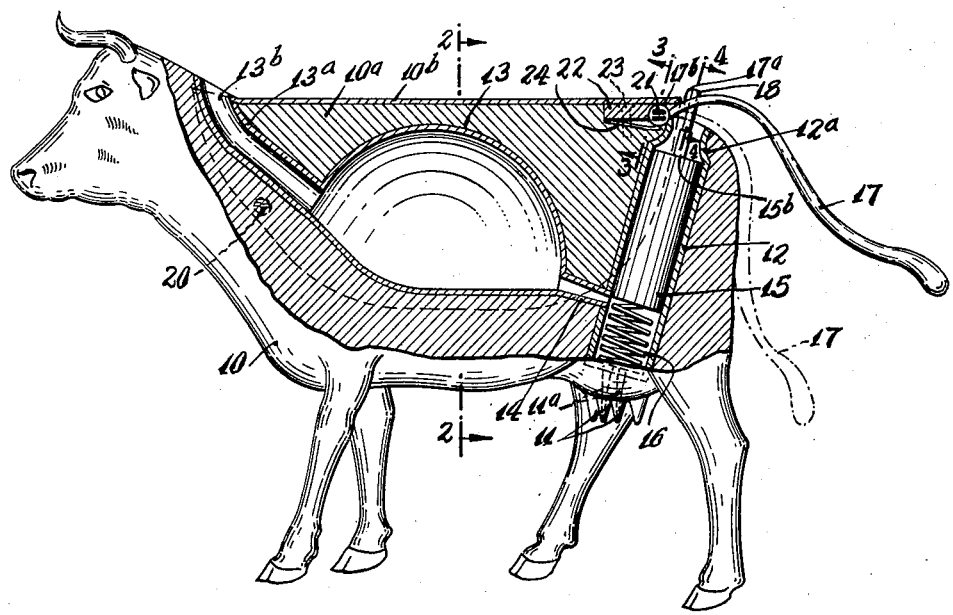
Fig. 1 is an elevational view of a cow toy constructed according to this invention, a portion thereof being broken away to illustrate interior parts.
Figure 2:
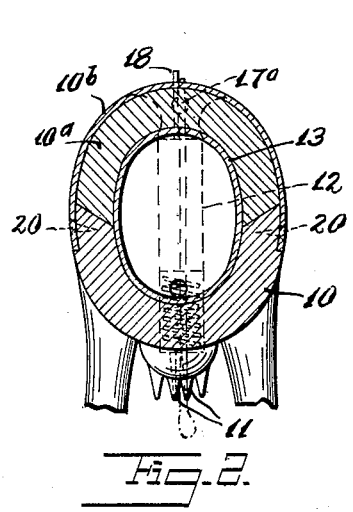
Fig. 2 is a transverse sectional view taken on the line 2—2 of Fig. 1.
Figure 3:
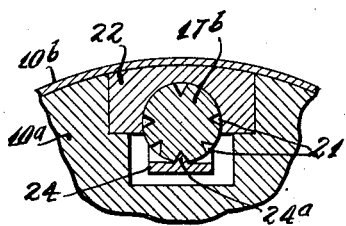
Fig. 3 is a fragmentary enlarged sectional view taken on the line 3—3 of Fig. 1.

The milking cow toy, according to this invention, comprises material 10 formed to simulate a cow and having perforated teats 11. A hollow cylindrical casing 12 is arranged within the cow figure and extends from the teats 11 to the hind portion of the cow figure. A liquid bottle 13 is arranged within the cow figure and has an outlet pipe 14 connecting with the lower portion of the casing 12. A valve 15 is slidably mounted within the casing 12 and is adapted to extend over the outlet pipe 14 for control of the liquid passing from the liquid bottle to the teats.

A resilient element in the form of an expansion spring 16 is arranged beneath the valve 15 and acts against a portion of the material of the cow figure and normally urges the valve upwards. A tail 17 for the cow figure is arranged to carry a plurality of radially extending fingers 18 of different lengths selectively engageable against the top portion of the valve 15 to move the valve downwards through pre-determined distances when the tail is moved downwards. A means is provided for holding the tail 17 in different rotated positions to place a selected radial finger against said valve 15.

The material from which the cow figure is constructed may be glass, metals, or other materials. The cow body 10 is formed of several sections. There is a top section 10ᵃ which is held in position by a covering skin or plate 10ᵇ. This plate is held in place by several screws or other fastening elements 20. When the plate 10ᵇ is removed, the portion 10ᵃ may be removed and this permits the removal of the bottle 13.

The bottle 13 has a throat portion 13ᵃ which extends upwards to the back of the neck of the cow figure and there is an inlet 13ᵇ through which liquid may be supplied to the bottle. The cylindrical casing 12 has a top edge portion 12ᵃ which forms an abutment for limiting downward motion of the tail 17. The fingers 18 are capable of extending in past the edge portion 12ᵃ and so depress the valve, depending merely upon the length of the particular figure. The perforations 11ᵃ through the teats 11 are so small that due to capillary action there will be no free flow of the fluid through the teats. The valve 15 is arranged so that in a raised position, as shown in full lines in Fig. 1, the outlet 14 can supply the lower portion of the cylinder 12 with the liquid. Then when the valve 15 is moved downwards the pressure caused by the downward motion is sufficient to cause the liquid to trickle out through the teats 11. The further the valve 15 is moved downwards the greater will be the discharge of the liquid.

The tail 17 has a shank portion 17ᵃ from which the radial fingers 18 project. The inner end of the shank portion is provided with a spherical member 17ᵇ. This member is clamped into a hollow spherical socket forming a universal joint. The spherical member 17ᵇ is formed with a plurality of substantially parallel grooves 21 extending longitudinally of the stem 17ᵃ. There is a block 22 which is held in position by screws 23 and which forms a portion of the spherical bearing for holding the spherical member 17ᵇ. There is a resilient leaf spring 24 held beneath the block 22 and having a projecting portion 24ª engaging one of the grooves 21. It is this projecting portion which holds the tail 17 against rotation. The tail may be moved upwards and downwards by the fingers 24ª merely working within a particular groove. When desired the tail 17 may be turned and then the leaf spring 24 will flex and the finger 24ª disengage from the particular groove and re-engage in the next adjacent groove. In this respect the tail may be adjusted to various rotative positions.

Figure 4:
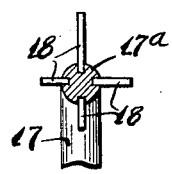
Fig. 4 is a fragmentary sectional view taken on the line 4—4 of Fig. 1.

For certain of the grooves 21 there is a gripping finger 18. These fingers are of different lengths as may be seen from Fig. 4. There are more grooves 21 than fingers 18 so that the tail may be set to an inoperative position with the fingers 18 straddling the valve 15. The valve 15 is provided with a top head in the form of a rod 15ᵇ. The fingers 18 are adapted to engage against the end of the rod 15ᵇ.

The operation of the device is as follows:—

Liquid simulating milk, or milk, or any other liquid may be placed into the bottle 13 through the opening 13ᵇ. This milk will flow down to the teat apertures 11ª. It will not discharge because of capillary action. The tail 17 may then be operated like a pump handle and the reciprocation of the valve 15 will cause discharge of the fluid from the teats.

The tail 17 may be turned to several positions to engage different radial fingers 18 against the rod 15ᵇ of the valve 15, and so the valve may be caused to move through different distances. The spring 16 maintains the valve in a raised position. The tail 17 is limited when being moved downwards by the edge portion 12ª of the cylinder 12. The extent through which the valve 15 will be moved depends upon the length of the finger 18 which is in contact with the rod 15ᵇ. The tail 13 may be turned to different positions to engage different ones of the fingers 18 against the rod 15ᵇ.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. A milking cow toy comprising material formed to simulate a cow and having perforated teats, a hollow cylindrical casing within said cow figure and extending from the teat portion to the hind portion, a liquid bottle within said cow figure and having an outlet pipe connecting with the lower portion of said casing, a valve slidable in said casing and adapted to extend over said outlet pipe to control the passage of liquid through said teats, resilient means for urging said valve upwards, a tail for the cow figure and carrying radial fingers of different lengths selectively engageable against the valve to move the valve downwards through predetermined distances when the tail is moved downwards, and means for holding said tail in different rotated positions to place a selected radial finger against said valve.

2. A milking cow toy comprising material formed to simulate a cow and having perforated teats, a hollow cylindrical casing within said cow figure and extending from the teat portion to the hind portion, a liquid bottle within said cow figure and having an outlet pipe connecting with the lower portion of said casing, a valve slidable in said casing and adapted to extend over said outlet pipe to control the passage of liquid through said teats, resilient means for urging said valve upwards, a tail for the cow figure and carrying radial fingers of different lengths selectively engageable against the valve to move the valve downwards through predetermined distances when the tail is moved downwards, and means for holding said tail in different rotated positions to place a selected radial finger against said valve, said material from which the cow is made being glass.

MARK ANTHONY BUCCI.